(12) United States Patent
Bergsten et al.

(10) Patent No.: US 7,039,879 B2
(45) Date of Patent: *May 2, 2006

(54) METHOD AND APPARATUS FOR SCROLLABLE CROSS-POINT NAVIGATION IN A USER INTERFACE

(75) Inventors: Jonas Bergsten, Linköping (SE); Per Sökjer, Linköping (SE)

(73) Assignee: Nokia Corporation, Espoo (FI)

( * ) Notice: Subject to any disclaimer, the term of this patent is extended or adjusted under 35 U.S.C. 154(b) by 591 days.

This patent is subject to a terminal disclaimer.

(21) Appl. No.: 09/893,850

(22) Filed: Jun. 28, 2001

(65) Prior Publication Data

US 2003/0001907 A1 Jan. 2, 2003

(51) Int. Cl.
*G06F 9/00* (2006.01)

(52) U.S. Cl. .................. 715/853; 715/763; 715/725; 715/841; 715/843

(58) Field of Classification Search ........ 713/719–722; 345/853, 763, 725, 841–843; 725/44, 45, 725/46, 47, 52, 61
See application file for complete search history.

(56) References Cited

U.S. PATENT DOCUMENTS

| | | | | |
|---|---|---|---|---|
| 4,241,521 A | * | 12/1980 | Dufresne | 434/112 |
| 5,059,965 A | * | 10/1991 | Geiser | 340/995.23 |
| 5,283,560 A | * | 2/1994 | Bartlett | 345/729 |
| 5,485,175 A | | 1/1996 | Suzuki | 395/156 |
| 5,677,708 A | * | 10/1997 | Matthews et al. | 345/684 |
| 5,751,369 A | | 5/1998 | Harrison et al. | 348/552 |
| 5,815,155 A | | 9/1998 | Wolfston | 345/357 |

FOREIGN PATENT DOCUMENTS

WO    WO 00/79374 A1    12/2000

* cited by examiner

*Primary Examiner*—Kristine Kincaid
*Assistant Examiner*—Peng Ke
(74) *Attorney, Agent, or Firm*—Cohen, Pontani, Lieberman & Pavane

(57) ABSTRACT

Method and apparatus for controlling an electronic device by navigating through a hierarchy of groups of commands while continuously providing the current location and path in the hierarchical structure. A displayed scrollable cross-point navigation image has two bars, each containing panels corresponding to a separate folder, etc. At the intersection of the bars is displayed the current lowest level and the next upper level, if any. The next higher level is shown in an adjoining panel on a first bar, the next higher level in a next adjoining panel on that bar, until there are no further higher levels to display, at which point the remaining upper-most level folders are displayed. The second bar displays subfolders or settings within the folder in the focus panel. Moving in the folder hierarchy causes the panels in the first bar to shift to display all intervening levels through the top level.

20 Claims, 9 Drawing Sheets

METHOD AND APPARATUS FOR SCROLLABLE CROSS-POINT NAVIGATION IN A USER INTERFACE

FIELD OF THE INVENTION

The present invention relates to a method and apparatus for selecting or adjusting services or settings of an electronic device on a display of the electronic device.

BACKGROUND OF THE INVENTION

The conventional means of selection of services on or adjustment of settings of electronic devices, including, for example, a TV, set-top box, DVD player, VCR, domestic appliance, and other similar devices, typically has the disadvantage of covering the entire area of the device's display and also typically requires a significant number of key depressions until the desired selection is shown and is selected. This selection process is a significant problem for many users of such electronic devices, including disabled persons and those who are unfamiliar with setting electronic devices, are fearful of adjusting such devices, have no patience to deal with the user interface which is often complex, or who do not want to spend the time and effort reading the device's operational manual. Such device operational manuals, if actually supplied with the device (which is not always the case), are typically somewhat incomprehensible due either to their technical complexity, the complexity of the technical language used, their over-simplicity, their bad writing style, or their unavailability in the user's native language.

Additionally, remote control devices, such as those used with televisions, DVD players, VCRs, etc., have a large number of keys, and the design of the key pads for each device is typically different for different manufacturers of like devices and even different for different devices of like manufacturers.

There is thus a need for an electronic device user interface that is simple for a user to operate without the need to study an incomprehensible written user's manual.

One such user interface that solves the aforementioned problems is disclosed in PCT Patent Publication No. WO 00/65429. In accordance with that user interface, a display on or associated with the electronic device presents to the user a pair of intersecting cross-point navigation bars. At least one of these bars is scrollable, and each bar displays one or more object fields. By selectively scrolling one or both of the bars, one at a time, by pressing appropriate buttons on the electronic device or its remote controller, the user positions a particular object field, or selection, at the point where the two bars intersect. When the user depresses a "select" button, the displayed object field is selected, and either a bar of the display transforms to the selected sub-field, or the electronic device performs the action corresponding to the displayed object field selected, thereby adjusting or setting the electronic device in the desired manner. By pressing another button when a particular object field is at the intersection of the two bars, the level of the object field displayed in the entire corresponding bar is changed so that the user is given a group of choices that fall under the selected object field category. Thus, for example, if the vertical bar has six object fields (A, B, C, D, E, and F), the horizontal bar will show sub-fields corresponding to the object field positioned at the intersection of the two bars (F-1, F0, F1, F2, F3, etc.), as shown in FIG. 2*a* of the patent publication. If the user depresses a predefined navigation key, sub-sub-fields (F2:-1, F2:0, F2:1, F2:2, F2:3, etc.) corresponding to the sub-field (F2) positioned at the intersection of the two bars are then displayed on the vertical bar, as shown in FIG. 2*b* of the patent publication. In actual use, words descriptive of, for example, instruction categories or actual instructions to be transmitted to the electronic device are displayed to the user, not merely letters and numbers. Such listing and selection of sub- and sub-sub-fields can go down to as many levels as is necessary to provide the user with a desired selection of options. To navigate upward through the levels, a second predefined navigation key is depressed by the user, and, as a result, the visual content of the appropriate bar is changed to reflect a change in field level.

Although the user interface disclosed in PCT Patent Publication No. WO 00/65429 is fully able to permit a user to satisfactorily navigate among a plurality of possible instructions or device settings arranged in a plurality of groups, sub-groups, sub-sub-groups, etc., it may be somewhat difficult for a user to determine where in the menu hierarchy of possible instructions and groups of instructions he currently is so that he can easily navigate to another desired available electronic device instruction or setting, or group of such instructions or settings. This difficulty arises because only two levels of groups (or fields) are simultaneously displayed to the user. Whenever a group, sub-group, etc. is selected, the appropriate bar is overwritten by the sub-entries in the selected group or sub-group. Thus, no map is displayed showing generally where in the hierarchy of groups, sub-groups, etc. the user currently is located. As a result, a user unfamiliar with the hierarchy of the groups may be forced to randomly press the navigation buttons repeatedly, thereby navigating up, down and/or through the levels, until he has found the desired instruction or group of instructions, or a group of instructions or an instruction that is familiar to the user to enable him to navigate to the instruction or group of instructions actually desired.

SUMMARY OF THE INVENTION

The present invention provides a method and apparatus for controlling, adjusting and/or setting of electronic devices and appliances controlled by remote control devices, such as wireless and pointing devices, or also voice-controlled devices. The invention allows the user to navigate through a hierarchy of groups of commands or selections while continuously providing the user with information as to where the user is currently located in the hierarchical structure of groups so that navigation through the groups and individual selections is simplified.

Suitable electronic devices and appliances to be controlled include, for example, television sets, satellite receivers, set-top boxes, cable television controllers, computers, household equipment, telephones, mobile phones, personal digital assistants, DVD players, CD players, VCRs, stereo equipment, etc., especially appliances provided with user interfaces such as display screens for interaction with remote control and other key pad devices.

In accordance with the present invention, a scrollable cross-point navigation image is displayed on a user interface display to select a feature by combining two object fields. Two bars are displayed, each bar containing a plurality of panels, with each panel displaying a separate folder or particular setting. The two bars are positioned so that the bars overlap in a single focus panel. Preferably, the two bars are sized, shaped and positioned so as not to completely obscure the entirety of the display. As a result, a user can view the two bars, and can also view any programming or other information that is also being presented on the display.

The instructions, settings and/or selections that are available for selection by the user to adjust or set the electronic device are arranged in an associated database in one or more levels of groups (sub-groups, sub-sub-groups, etc.) so that settings, etc. of a similar nature are in the same group, with the top most level being the most general, and the lowest most level being particular instructions. In between the top and bottom levels, there may be sub-levels which organize the contents of the database. The items in each level are linked to one or more items in immediately higher or lower levels, if any, to form a tree-like hierarchical structure.

When a user initially activates the user interface feature of the electronic device by entering the appropriate command on an input device, the user interface appears on a display on or associated with the electronic device being controlled. The focus panel displays (1) the user's current lowest level in the hierarchical structure of groups of settings or selections and (2) the next higher level, if any. The next higher level, if any, is shown in an adjoining panel on the horizontal bar, the next higher level, if any, is shown in a next adjoining panel on the horizontal bar, and so on until there are no further higher levels to display, at which point the remaining upper-most level folders are displayed in the panels on the horizontal bar. In the panels of the vertical bar are sub-folders, if any, or individual settings, if any, that are within the folder appearing in the focus panel, that is, such sub-folders or settings that are of the same level as the user's current lowest level in the hierarchical structure appearing in the focus panel. As the user descends down the folder hierarchy, the panels in the horizontal bar shift to the right and panels identifying levels between the current level and the top most level are displayed. As the user ascends through the folder hierarchy, the panels in the horizontal bar shift to the left. To navigate up or down folder levels and to select a particular folder at any level, the user employs the input device to cause the bars, one at a time, to scroll up, down, left and right to cause a particular panel to be shifted into the focus panel and thereby navigate through the various levels of the hierarchical structure of groups of settings or selections. When the focus panel is positioned at a desired folder, the user selects it with the input device. If a particular ultimate setting or instruction within a folder, sub-folder, etc., is selected by the user, the electronic device is instructed to perform the function of that setting or instruction. To move upward in the hierarchy to one of the folders shown in the horizontal bar to the right of the focus panel, the user simply uses the input device to scroll the horizontal bar as desired.

The user interface, thus, always displays the user's current location in the hierarchical structure and the path of the folder, sub-folder, and sub-sub-folder, etc., that the user descended through to get to the current location. Because this folder path information is continuously displayed to the user, navigation through the folder structure and the instructions or settings within that structure is immediately apparent and simple without the need for a user's manual explaining the structure of the folder structure.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
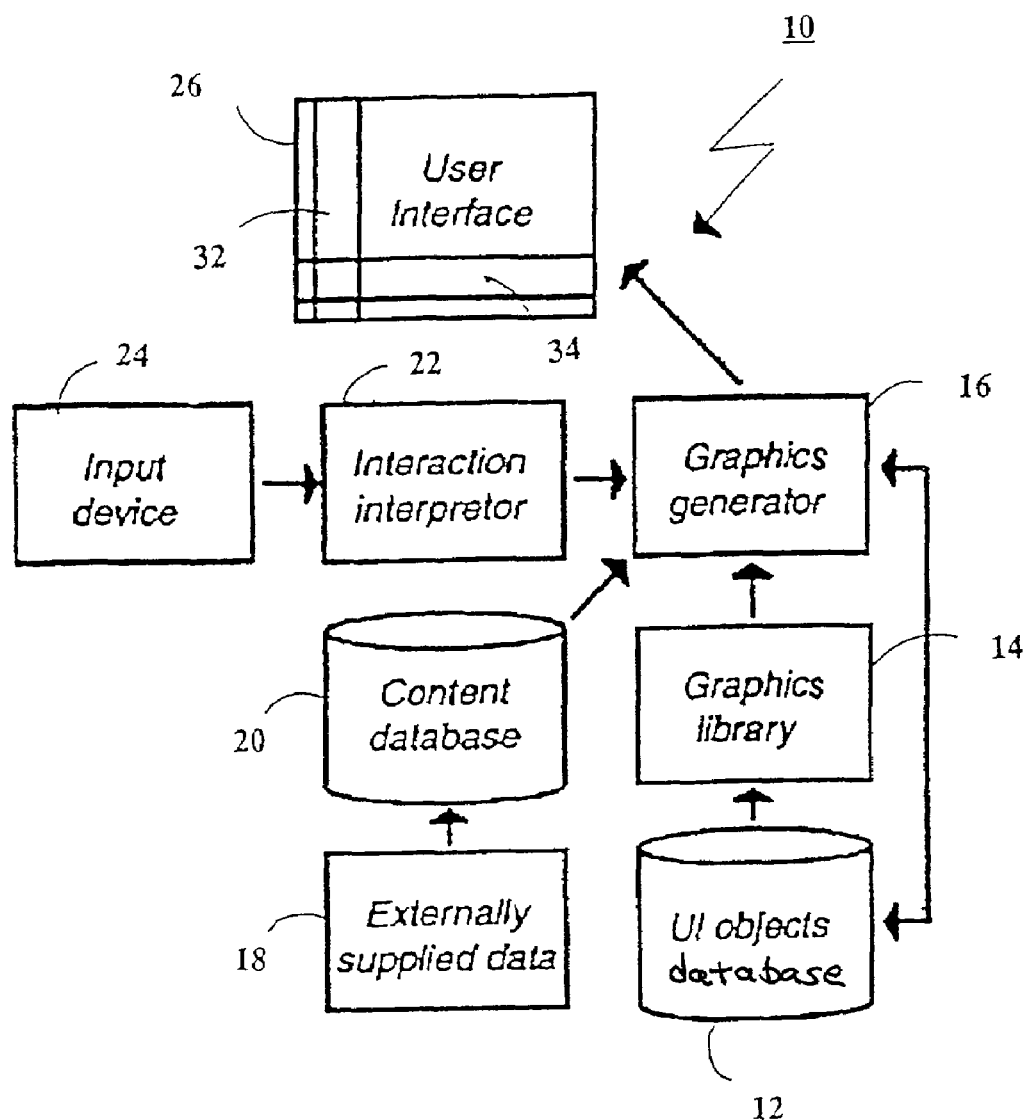
FIG. 1 is a schematic block diagram illustrating one embodiment of means used to accomplish a apparatus in accordance with the present invention.

FIG. 1 is a schematic block diagram of one embodiment of an apparatus 10 in accordance with the present invention, comprising a UI objects database 12, a graphics library 14, a graphics generator 16, an externally supplied data means 18, a content database 20, an interaction interpreter 22, an input device 24, and a user interface 26.

The input device 24 is any means that can be employed by a user to enter commands to control the user interface 26 and can be any of a number of manual controllers, such as, for example, a hand-held remote control with a keypad for a television set-top box, a keyboard for a PC, a remote controlled computer mouse, or a control panel with a keypad for a microwave oven. When a user wants to change a setting of the interface 26, the input device 24 is manipulated, such as by the depressing of keypad buttons, to transmit a signal to the interaction interpreter 22. Preferably, as will become more apparent from the discussion below, the input device has directional keys (up, down, right, and left) and a "select" key which a user can depress to provide a selection command. The input device 24 may instead and/or also comprise means for detecting and interpreting spoken commands of the user. A spoken command device would for example, include a microphone, a data processor, a database containing vocabulary data, and speech recognition software to recognize voice commands of a user to the electronic device An interaction interpreter 22 interprets signals received from the input device 24 and sends the corresponding instruction to a graphics generator 16. The interaction interpreter 22 transforms commands from the input device 24 to actions provided by the graphics generator 16.

The content database 20 contains information, and groups or folders of information which can be presented on the user interface 26, which is preferably a screen, such as a television screen, monitor or flat panel display, such as liquid crystal or a plasma display. Samples of such information could be, for example, names of object fields containing sub-object fields or finite objects and help-texts that are presented to a user upon entry by the use of the appropriate commands. An object field is the name of a class or group of settings, sub-fields of settings, or sub-sub-fields of settings, etc. An example of an object field is the category or group, "Films". A finite object is a direct setting of a feature for the electronic device. An example of a finite object is the particular film, "Die Hard". All material in the content database 20 can be altered and/or edited by a content provider, such as the original equipment manufacturer of the electronic device, or the service provider of material presented to the user and controlled through the user interface 26. Such a service provider would include a cable television company that transmits television programming, movies and other entertainment to a user. In addition, if desired, some or all of the material in the content database may be altered and/or edited by the user. For example, a user may want to delete certain television stations that are not of interest, the user may want to rename folders, or the user may want to add additional objects, folders, subfolders, etc. Such added material might include bookmarks or shortcuts to web pages or locally stored content (such as folders, documents, video files, music files, etc. on a memory hard drive), control settings to a connected device at the user's location (such as a CD, DVD or video tape player/recorder), etc.

Externally supplied data 18 represents any content that is in the content database 20 from any source.

The UI objects database 12 contains types of graphical objects that can be presented on the user interface 26. The UI objects database 12 supplies a graphics library 14 with generic representations of the types of graphical objects. The graphics library 14 contains functions to manipulate the UI objects in the interface 26. The graphics library 14 supplies the graphics generator 16 with specific instances from the UI objects database 12.

The graphic generator 16 controls the graphical presentation of the user interface 26 as well as manipulation accomplished by a user. The graphics generator 16 performs actions signaled by the interaction interpreter 22 through collecting content from the content database 20 and by merging the content with the graphics library 14 and delivering presentation of a desired action to the user interface 26. The user interface 26 presents feedback of any action performed by a user of the interface 26.

Figure 2:
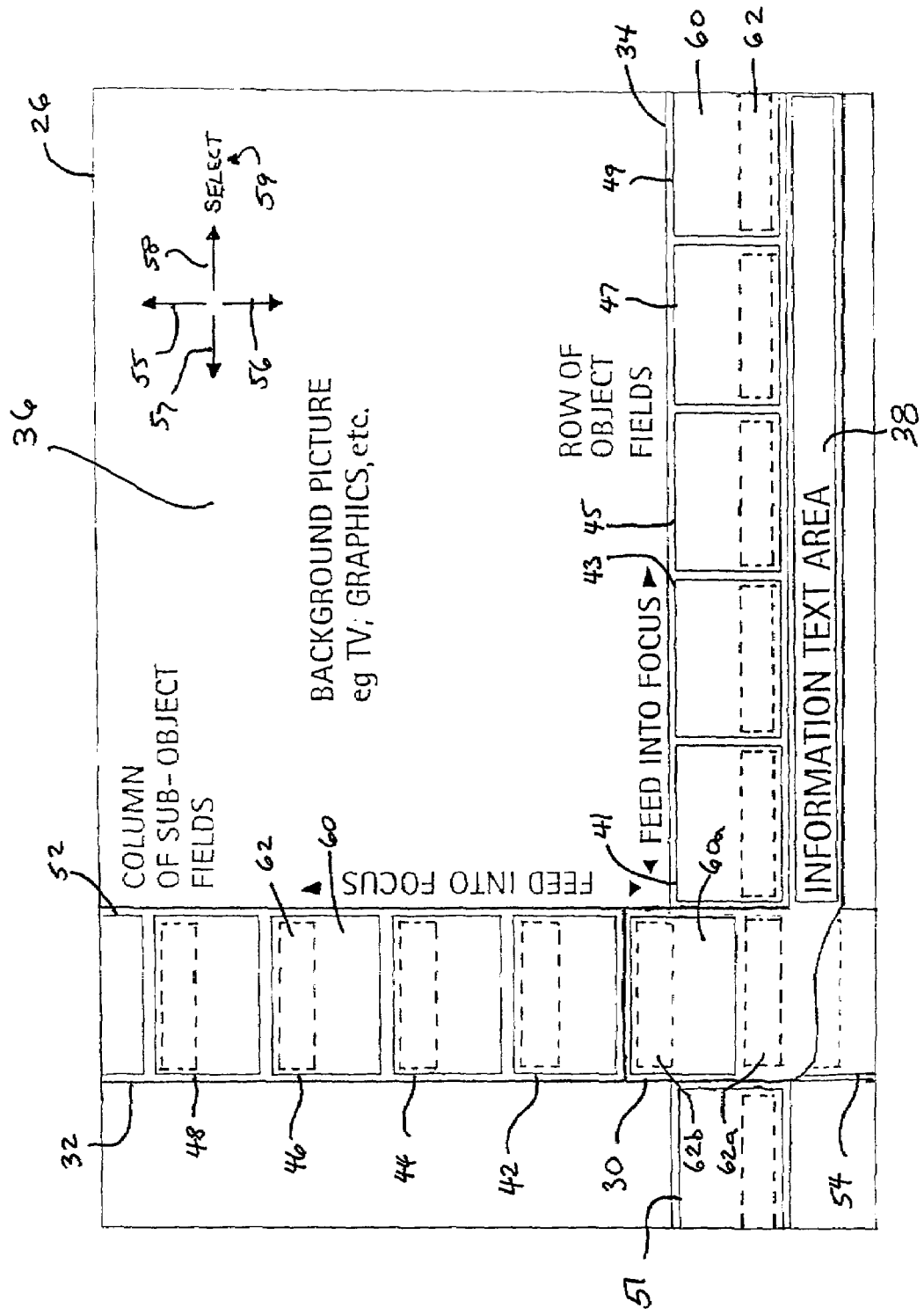
FIG. 2 is a schematically diagram of a preferred embodiment of a user interface in accordance with the present invention.

FIG. 2 schematically illustrates a user interface 26 in accordance with one embodiment of the present invention. The user interface 26 has two intersecting bars, preferably, a vertical bar 32 and a horizontal bar 34. The bars 32, 34 are preferably perpendicular to one another and are positioned proximate edges of the display area of the user interface 26 so that obstruction by the bars is minimized of any background picture 36, such as a television program, graphics, etc. Although the bars 32, 34 are shown as being positioned proximate the left and bottom edges of the user interface, alternatively, they may be at any other location, such as free floating at any location in the background picture 36, or may be positioned along adjacent edges of the user interface. In addition, although bars 32, 34 are shown as being linear in shape, they may assume any shape, such as, for example, curved into two circular or oval lines. Each of the bars 32, 34 is comprised of a plurality of panels, with vertical bar comprising panels 54, 30, 42, 44, 46, 48 and 52, and with horizontal bar comprising panels 51, 30, 41, 43, 45, 47 and 49. Each bar 32, 34 may comprise more or fewer panels, as desired. The two bars, 32, 34 intersect with a common panel, focus panel 30. Although the panels are show as being substantially rectangular in shape, they may assume any shape, such as square, oval, round, hexagonal, etc. Each of the panels preferably has one or more areas on which appears textual information and/or graphics. For example, each panel of the vertical bar 32 has a smaller upper area 62 and a larger central area 60. Similarly, each panel of the horizontal bar 34 has a smaller lower area 62 and a larger central area 60. The focus panel 30, which is the panel where the vertical bar 32 and the horizontal bar 34 intersect, preferably has a larger central area 60*a*, a smaller lower area 62*a*, and a smaller upper area 62*b*. The areas 60, 60*a*, 62, 62*a*, and 62*b* of the panels are used to display the textual information and/or graphics, as discussed below. The user interface 26 preferably also has an information field 38 positioned below the horizontal bar 34 where additional information can optionally be displayed. Finally, the user interface 26 preferably displays a plurality of possible navigation commands, shown as up, down, left and right arrows 55, 56, 57, 58 and a "Select" command 59. Although the navigation commands are shown as directed arrows 55, 56, 57, 58, they may also be depicted as words or other pictures, such as pointing fists. The navigation and "Select" commands may be continuously displayed and highlighted when the user selects a particular command with the input device 24, or, alternatively, only displayed when a user actually selects that command. Although the command graphics 55, 56, 57, 58, 59 are show in the upper right of the user interface 26, they may be in any position. Preferably, the command graphics 55, 56, 57, 58, 59 are omitted entirely from the display at all times. However, if the user interface is a mouse, the display command graphics, such as those shown, enable selection by the user of a command by clicking with the mouse's pointer on the appropriate command graphic 55, 56, 57, 58, 59. Additional, if the display is a touch screen, command graphics may be displayed so that touching by the user of the appropriate graphic selects that command for execution.

The various portions of the bars 32, 34, any text or graphics on the bars 32, 34, and the commands 55, 56, 57, 58, 59, and are preferably suitably colored or shaded to contrast appropriately against the background picture 36 and other elements of the displayed information on the user interface 26 so that the user can easily discern all of the displayed information.

In operation, a user initially activates the user interface feature of the electronic device by entering the appropriate command on the input device 24. Thereupon, the user interface 26 appears on the appropriate display on or associated with the electronic device. For certain electronic devices where information of interest is continuously shown, such as entertainment programming on a television monitor, for example, it is desirable that the user interface 26 only appear when the user wants to change a setting of the television. For other electronic devices where the associated display does not provide any other information, such as, for example, a microwave oven, the user interface 26 might be continuously displayed.

All possible instructions, settings and/or selections available to the user to adjust or set the electronic device are arranged in the content database 20 in one or more levels of groups (sub-groups, sub-sub-groups, etc.) so that settings, etc. of a similar nature are in the same group. The items of a first level are very general. In a second level, the items are more detailed than in the first level, but are still somewhat general. In a third level, the items are even more detailed than in the second level. And so on. The items are linked according to their contents. This means that an item of the first level is linked to one or more items of the second level. Additionally, an item of the second level is linked to one or more items of the third level. And so on. Thus, with this linking structure, the items are arranged in a tree-like manner or hierarchical structure with any branch of the tree constituting a further level. Since, as discussed above, the user and/or the service provider may alter and/or edit the groups show at the various levels, a folder in one particular level, for example, may have more or fewer sub-groups, sub-sub-groups, etc. than other folders in that same level. Additionally, it is also possible that the user and/or service provider may want a particular ultimate selection or device command that is frequently used (and which one might expect to be relegated only to a sub-sub-group) to be positioned with folders at the highest level, for example.

As discussed in detail below with reference to FIGS. 3 to 9 in which a particular embodiment is shown, the user's current location within the folder hierarchy is continuously displayed to the user in the horizontal bar 34. The focus panel 30 displays (1) the user's currently selected lowest level in the hierarchy in area 62a and (2) the next higher level, if any, in the area 62b. As the user descends into the folder hierarchy, the next higher level, if any, is shown in panel 41, the level above the level shown in panel 41 is shown in panel 43, and so on to the right across horizontal bar 34 until there are no further higher levels to display, at which point the remaining upper-most level folders are displayed in the panels on the horizontal bar 34. As the user descends down the folder hierarchy, the panels in the horizontal bar 34 shift to the right and panels identifying levels between the current level and the top most level are displayed. As the user ascends through the folder hierarchy, the panels in the horizontal bar 34 shift to the left. To navigate up or down folder levels and to select a particular folder at any level, the user employs the input device 24 to activate "up", "down", "left", "right" and "SELECT" commands which cause the bars 32, 34 to scroll in the selected direction, as indicated in FIG. 2) to cause a particular panel to be shifted into the focus panel 30. In the panels of the vertical bar 32 are sub-folders, if any, or individual settings, if any, that are within the folder appearing in area 62a of focus panel 30, that is, such sub-folders or settings that are of the same level as the user's current lowest level in the hierarchical structure appearing in area 62b of the focus panel 30.

To more fully understand the present invention, one embodiment of the present invention is shown in operation in FIGS. 3 to 9, in which the numbering of the various elements has been simplified relative to FIG. 2. In this particular embodiment, the electronic device is a television with a cable television set-top box and the user interface is used to select a particular entertainment program from among a plurality of possible entertainment programs. The present invention is not restricted to such an electronic device, and, as stated above can be used in conjunction with many other types of electronic devices.

Figure 3:
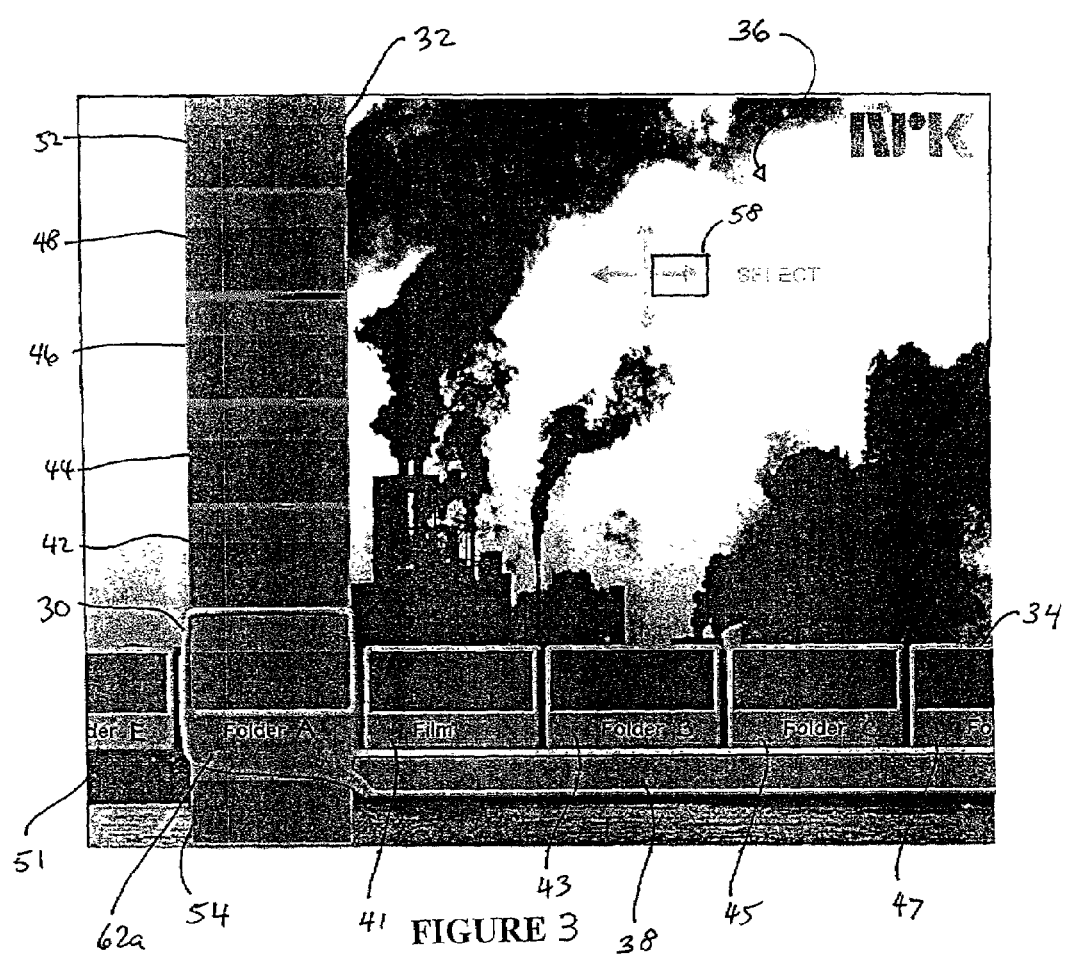
FIGS. 3, 4, 5, 6, 7, 8, and 9 show one embodiment of the present invention at various different stages of operation.

Referring initially to FIG. 3, horizontal bar 34 is comprised of six panels 51, 30, 41, 43, 45 and 47. In the lower areas 62 of the panels is text describing the name of the folder, group or field represented by the respective panels. The horizontal panels depict folders of categories of possible entertainment programming available to the user. Although all of the panels show the generic titles, "Folder A", "Folder", etc., except panel 41 which reads "Film", in actual operation the other panels would depict titles of other entertainment programming categories, such as, for example, "network television programming", "music video", "channel programming guide", "internet", etc. Rather than or in addition to text, graphics may be depicted on the panels, such as, for example, a movie projector for "Film", a television set for "network television programming", etc. The vertical bar 32 is comprised of seven panels 54, 30, 42, 44, 46, 48 and 52. These vertical panels depict sub-groups, bookmarks or selections, if any, collected in the folder identified in area 62a of focus panel 30. Although all of these panels except panel 30 are blank in FIG. 3, in actual operation, each panel would display a title or graphic representative of its contents. The bars 32, 34 are positioned proximate edges of the display so that a great proportion of the current programming 36 is visible. Information field 38 is blank in FIG. 3, but in practice would display relevant information, such as the date and time, the status of the electrical device, error messages, a short help message, etc. which are associated with the folder or bookmark identified in area 62b of focus panel 30.

As shown in FIG. 3, the positioning of the bars 32, 34 is preferably selected so as to minimize obstruction of a background picture 36 that is being shown on the display. In FIGS. 4 to 9 the background picture 36 is omitted merely to simplify the Figures, although in practice the background picture, if any, would be displayed.

Figure 4:
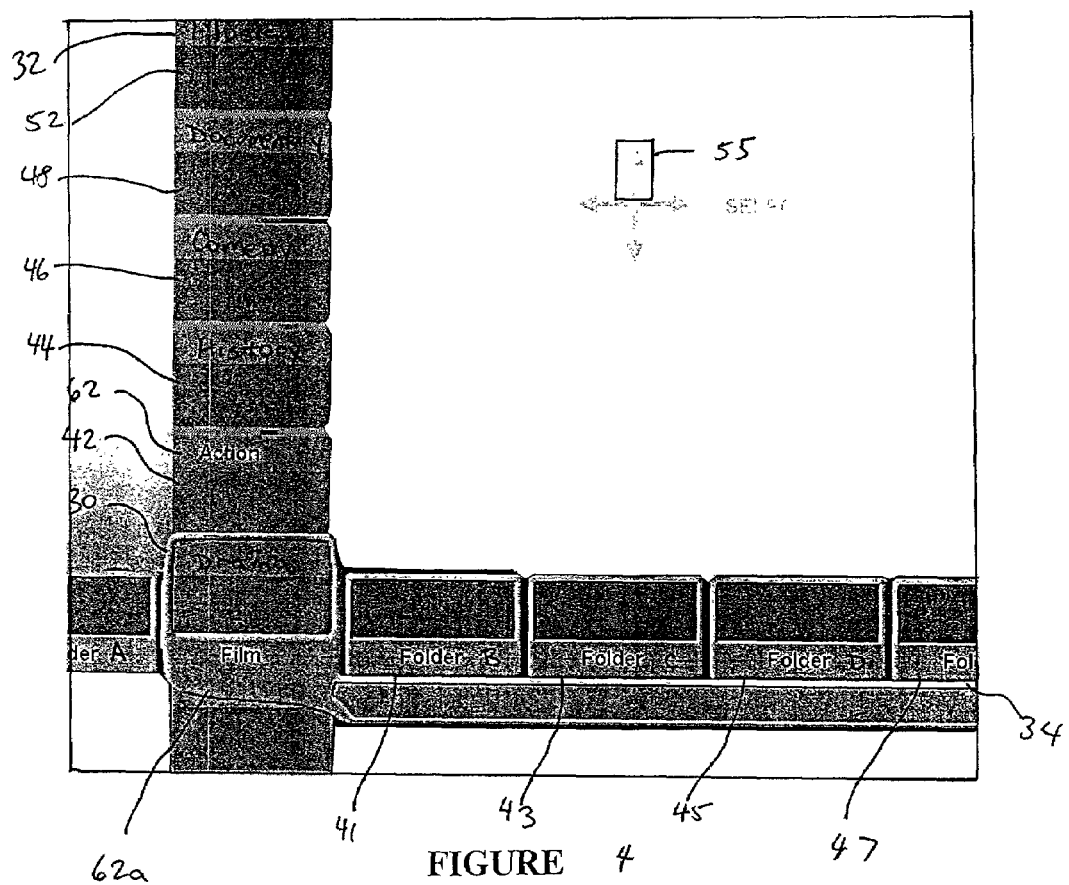

In this example, the user wants to view a "Film", the panel for which is to the right of focus panel 30. Consequently, the user uses the input device 24 to enter the "right" command once, as shown by the highlighted right arrow 58. The horizontal bar 34 shifts one position so that the focus panel 30 now shows "Film" in area 62a, as shown in FIG. 4. The vertical bar now shows in its panels the sub-groups, bookmarks or selections collected in the folder entitled "Film". One of panel 42 shows the category "Action" in its area 62, referring to action films. Other panels in vertical bar 32 display other exemplary categories of "Films", "Drama" (panel 30), "History" (panel 44), "Comedy" (panel 46), "Documentary" (panel 48), and "Musical" (panel 52).

Figure 5:
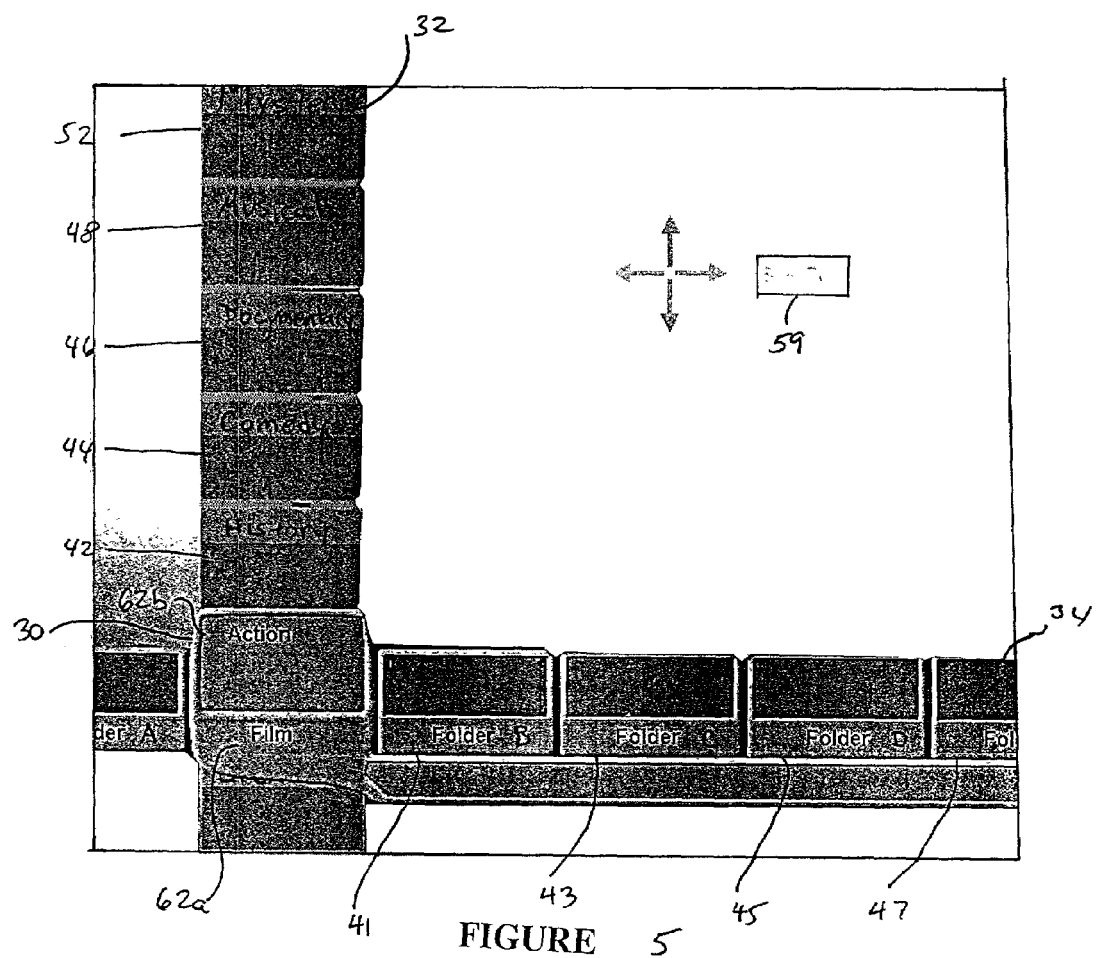
Figure 6:
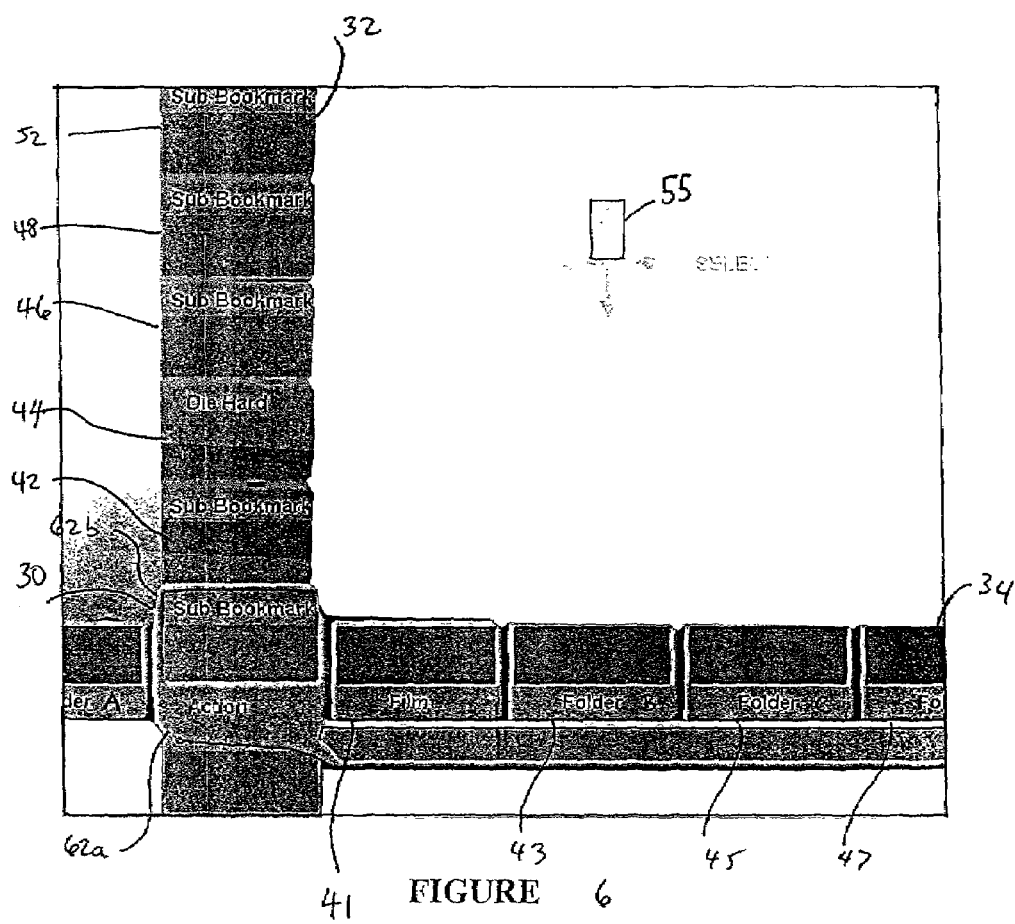

The user wants to view an Action film, the panel for which is up from the focus panel 30. Consequently, the user employs the input device 24 to enter the "up" command once, as shown by the highlighted up arrow 55. The vertical bar shifts one position so that the focus panel 30 now shows the sub-group "Action" in area 62b and the name for the group "Film" in area 62a, as shown in FIG. 5. To display the action films available, the user enters the "Select" command on the input device 24, as shown by the highlighted "SELECT" command 59. Upon selection, as shown in FIG. 6, the name for the group selected, "Film", is then shifted to the right to panel 41, the name for the selected sub-group or bookmark, in this case "Action", is substituted into area 62a of focus panel 30, and all of the available action films are shown on the panels of vertical bar 32. Vertical bar 32 now shows all sub-bookmarks categorized under the bookmark "Action" and the folder "Film".

Figure 7:
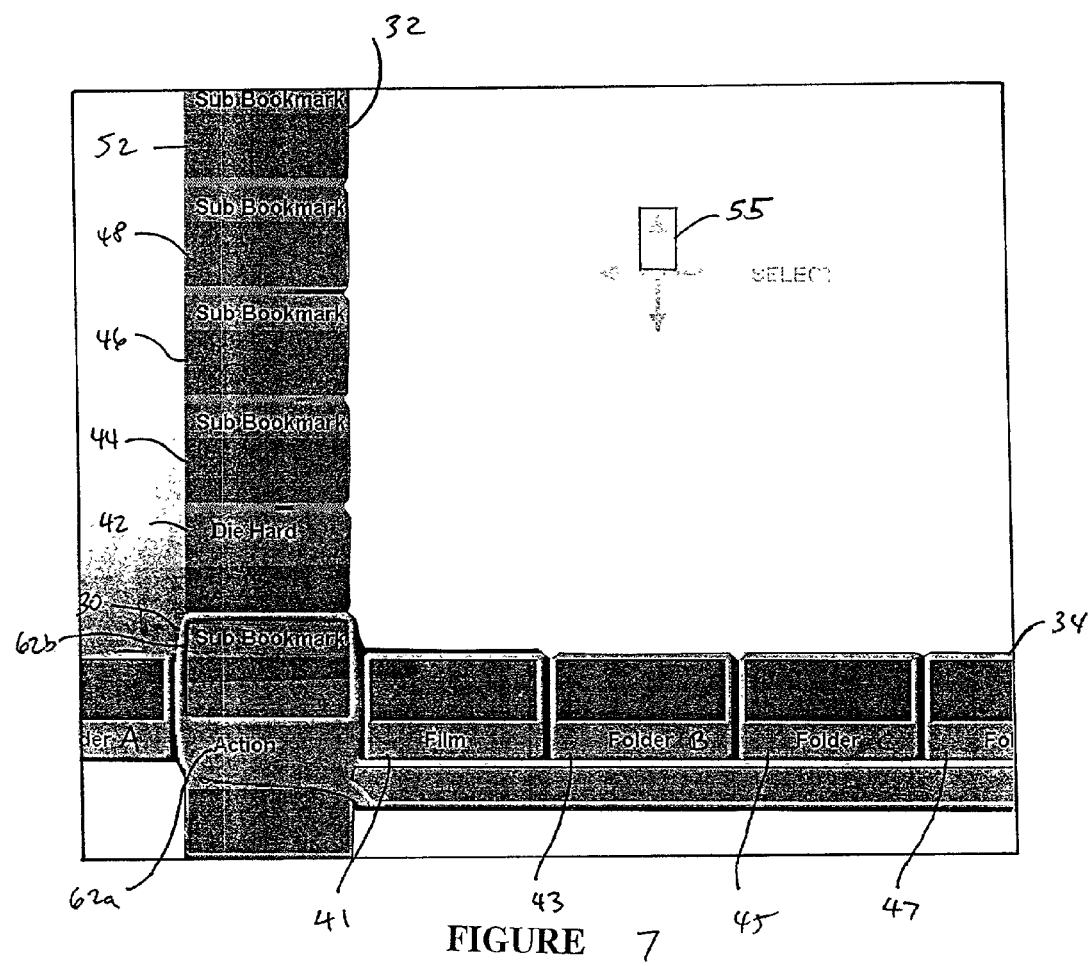
Figure 8:
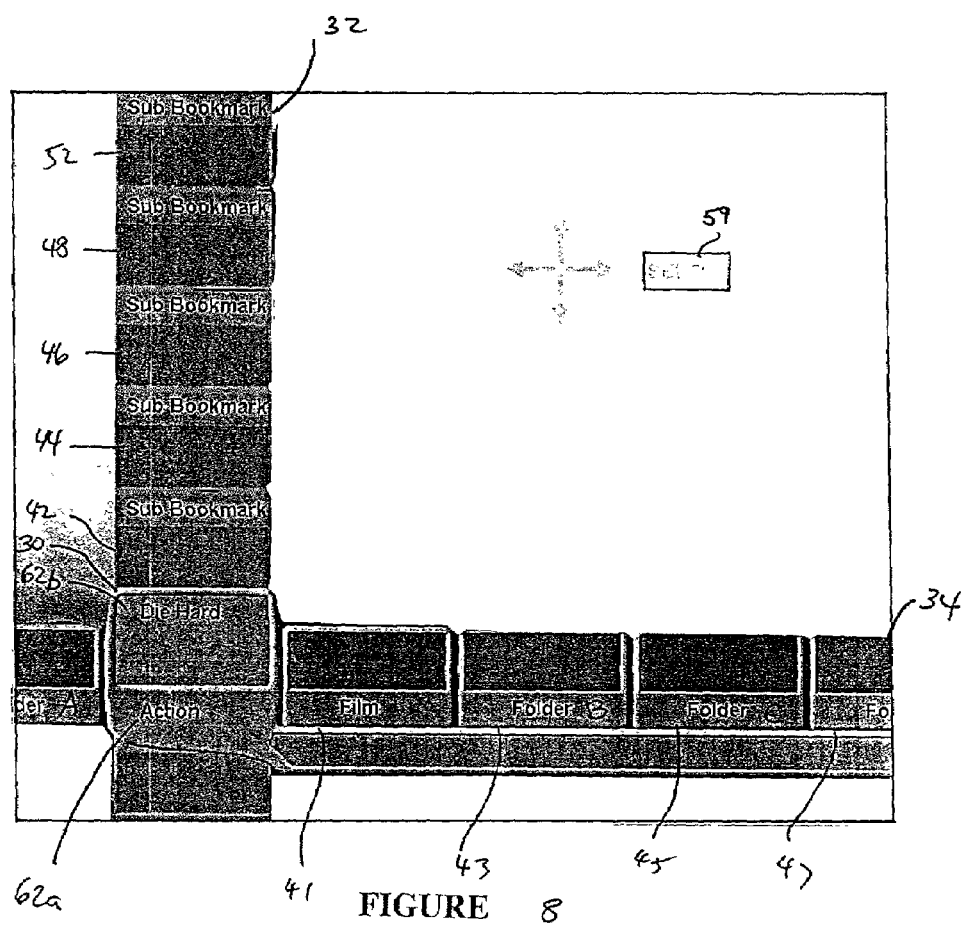

One of the available action films is "Die Hard", the title of which appears in panel 44 that is two panels up from focus panel 30. Although "Sub Bookmark" is shown for the other panels of the vertical bar, in practice the title of other available action films would be displayed in the panels. In a first step to select the film "Die Hard", the user enters the "up" command a first time, as shown by the highlighted up arrow 55. The vertical bar shifts one position so that the "Die Hard" panel shifts from panel 44 to panel 42, as shown in FIG. 7. In a second step to select the film "Die Hard", the user enters the "up" command a second time, as shown by the highlighted up arrow 55. The vertical bar shifts one position so that the "Die Hard" panel shifts from panel 42 to focus panel 30, as shown in FIG. 8, with "Die Hard" appearing in area 62b. Thus, in areas 62b of panels 42, 44, 48 and 52 appear sub-bookmarks (or selections) that are of the same level as the sub-bookmark "Die Hard" appearing in area 62b of focus panel 30.

Figure 9:
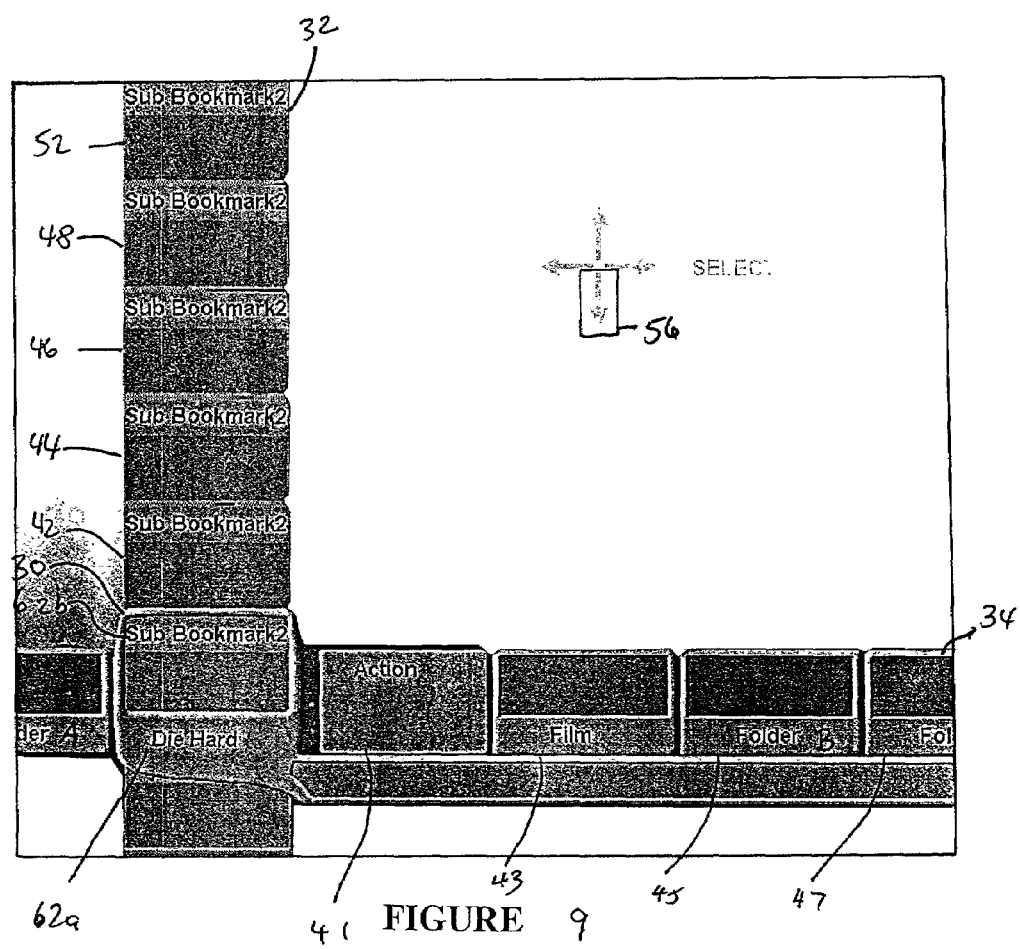

To see what options are available for the sub-bookmark "Die Hard", under the bookmark "Action" in the folder "Film", the user activates the select command, as shown by the highlighted "SELECT" command 59. Upon selection of the sub-bookmark "Die Hard", as shown in FIG. 9, the name for the group selected, "Film", is then shifted to the right to panel 43, the name for the selected sub-group or bookmark "Action" is shifted to the right to panel 41, the name for the selected sub-bookmark "Die Hard" is placed into area 62a of focus panel 30, and the available sub-sub-bookmarks (each labeled as "Sub Bookmark2") for "Die Hard" are displayed in the vertical bar 32. Although in FIG. 9 panels 42, 44, 46, 48 and 52 all merely show the title "Sub Bookmark2", in practice various selections would be shown such as, for example, "Movie", "Movie Trailer #1", "Movie Trailer #2", "Director's Commentary", "Filming Special Effects", or "Scene Selection" which, if selected, would list as sub-sub-sub bookmarks, various scenes in the film "Die Hard" that can be viewed. The user can then select the "Sub Bookmark2" of interest for viewing. If the sub-sub-bookmark "Sub Bookmark2" selected is itself a folder containing additional sub-sub-sub-bookmarks, the panels of horizontal bar 34 are shifted to the right by one position and the areas 62a and 62b of focus panel 30 are appropriately modified.

As shown in FIG. 9, even though the user has descended down a number of levels in the folder hierarchy, the current location is immediately apparent: panel 43 shows folder "Film", panel 41 shows bookmark "Action", area 62a of focus panel 30 shows sub-bookmark "Die Hard", and area 62b of focus panel 30 shows sub-sub-bookmark "Sub-Bookmark2".

If the user wanted to move upward in the folder hierarchy, the appropriate commands (up, down, left, right, and select) are entered and the horizontal and vertical bars 32, 34 are then appropriately modified. Thus, if the user wanted to ascend to the level, shown in FIG. 3, from the point shown in FIG. 9, the user would merely enter the "left" command one time, as is evident from the fact that in FIG. 9 the panel "Film" is shown as being two positions away from the focus panel 30.

Because the user's current location is always apparent by a display of the folder path on the horizontal bar 34 irrespective of where in the folder hierarchy the user is currently located, navigation by the user up and down and across the folder hierarchy is apparent and simple to accomplish without requiring the user to study a lengthy detailed written user's manual.

To further ease understanding of the hierarchical structure of the folders and sub-folders etc., shown on the bars 32, 34, each level of folders preferably have a different color or coloring scheme. For example, the top level folders are green with black type, while at the next level down the bookmarks are blue with black type, and at the next level down the sub-bookmarks are red with white type, etc.

Although in the above-described embodiment the hierarchical structure of the user's current location is displayed in the panels on horizontal bar 34, alternatively this information may be displayed in the vertical bar 32 so that the information displayed in the bars 32, 34 are switched completely. Additionally, the names of the folders, bookmarks, etc. may be presented at any position on the panels, and instead of text, may be in graphical form and/or may also include graphics, as appropriate or desired.

Although the bars 32, 34 are shown as linear, they may be virtual loops so that when the user scrolls through the bar to one end, the next panel that is presented is the panel at the other end. Thus, if the loop comprises only the folders shown, after scrolling the horizontal bar 34 so that folders pass through the focus panel 30 one after the other until the folder originally in panel 49 moves to focus panel 30, the folder in panel 41 will become the folder that was originally in panel 51. A virtual loop may also have more entries than are displayed at once. Thus, for example, although only six folders are displayed, the virtual loop may actually contain many more than six folders, with others of the remaining folders being displayed as the user scrolls along the bar, thereby causing some of the initial six folders to disappear.

Movement of the panels of the bars 32, 34 may be accomplished by entering other commands than those discussed above, such as, for example, with reference to the discussion above concerning FIGS. 3 to 9 substituting "left" for "right", "up" for "down", etc. Although it is preferred for the input device 24 to have four movement command keys so that all four possible movement commands can be easily entered, alternatively only two movement command buttons may be needed if the bars 32, 34 are virtual loops as discussed. Thus, by pressing a horizontal movement command button repeatedly, the appropriate panel will eventually scroll to the focus panel 30.

To allow more of the background picture to be displayed to the user, one or more of the panels in one or both of the bars 32, 34 distant from the focus panel 30 may be transparent or semi-transparent. In addition, the focus panel 30 itself may also be semi-transparent. Although the bars 32, 34 are shown in the figures as being adjacent the left and bottom edges of the user interface, they may be positioned adjacent other edges of the user interface.

The focus panel 30 may be displayed in a higher intensity, be shadowed and/or be larger than the other panels to enhance the viewability of the focus panel 30.

As is apparent, the folders and sub-folders, etc., displayed on the user interface 26 are appropriate for the particular electronic device being controlled. For example, if the electronic device is a microwave oven, the folders at the top level might include categories of heatable food dishes, such as "main dishes", "snacks", "beverages", etc., and lower sub-levels for these folders might include other general categories such as "uncooked meal", "reheated meal", "frozen meal", with sub-sub-folders including particular meals such as "beef stew", "lasagna", "pizza", "fish", "French fries", "corn", etc.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for displaying information in a display associated with an electronic device, comprising:

organizing a plurality of information entries into a hierarchy comprising a plurality of groups, at least one of which groups having at least one sublevel of subgroups; and displaying panels on a display associated with an electronic device, the panels being arranged into two bars of panels with a common focus panel, each of the panels being linked to and identifying one of (a) one of the plurality of information entries, (b) one of the groups, and (c) one of the subgroups, wherein the focus panel identifies (a) a currently selectable lowest level in the hierarchy and (b) the next higher level, if any, wherein levels, if any, in the hierarchy higher than that displayed in the focus panel are identified in succeeding adjoining panels of a first of the two bars, other panels of the first bar identifying highest level groups in the hierarchy, and wherein panels of the second of the two bars each identify one of (a) information entries, if any, (b) groups, if any, and (c) subgroups, if any, of the same level in the hierarchy as the currently selectable lowest level in the hierarchy identified in the focus panel.

2. The method of claim 1, wherein the two bars are sized and positioned on the display so as to permit viewing of a substantial portion of a background image presented on the display.

3. The method of claim 1, wherein the two bars are perpendicular to one another.

4. The method of claim 3, wherein each of the two bars are positioned on the display to be proximate an edge of the display.

5. The method of claim 3, wherein each of the two bars are positioned on the display to be parallel to an edge of the display.

6. The method of claim 1, wherein the two bars are displayed on the display only upon entry of a command by a user.

7. The method of claim 1, wherein upon entry by the user on an input device of a selecting command, the electronic device performs an action corresponding to an information entry identified in the focus panel.

8. The method of claim 1, wherein a currently selected lowest level in the hierarchy identified in the focus panel is changed upon the entry of a navigation command by the user on an input device.

9. The method of claim 1, wherein information entries, groups, or subgroups linked to the panels are identified on the panels by at least one of text and graphics.

10. The method of claim 1, wherein at least one of the panels is one of semi-transparent and transparent.

11. An apparatus for displaying information in a display associated with an electronic device, comprising:
 a database storing a plurality of information entries in a hierarchy comprising a plurality of groups, at least one of which groups having at least one sublevel of subgroups; and
 a means for displaying panels on a display associated with an electronic device, the panels being arranged into two bars of panels with a common focus panel, each of the panels being linked to and identifying one of (a) one of the plurality of information entries, (b) one of the groups, and (c) one of the subgroups, wherein the focus panel identifies (a) a currently selectable lowest level in the hierarchy and (b) the next higher level, if any, wherein levels, if any, in the hierarchy higher than that displayed in the focus panel are identified in succeeding adjoining panels of a first of the two bars, other panels of the first bar identifying highest level groups in the hierarchy, and wherein panels of the second of the two bars each identify one of (a) information entries, if any, (b) groups, if any, and (c) subgroups, if any, of the same level in the hierarchy as the currently selectable lowest level in the hierarchy identified in the focus panel.

12. The apparatus of claim 11, wherein the two bars are sized and positioned on the display so as to permit viewing of a substantial portion of a background image presented on the display.

13. The apparatus of claim 11, wherein the two bars are perpendicular to one another.

14. The apparatus of claim 13, wherein each of the two bars are positioned on the display to be proximate an edge of the display.

15. The apparatus of claim 13, wherein each of the two bars are positioned on the display to be parallel to an edge of the display.

16. The apparatus of claim 11, wherein the two bars are displayed on the display only upon entry of a command by a user.

17. The apparatus of claim 11, wherein upon entry by the user on an input device of a selecting command, the electronic device performs an action corresponding to an information entry identified in the focus panel.

18. The apparatus of claim 11, wherein a currently selected lowest level in the hierarchy identified in the focus panel is changed upon the entry of a navigation command by the user on an input device.

19. The apparatus of claim 11, wherein information entries, groups, or subgroups linked to the panels are identified on the panels by at least one of text and graphics.

20. The apparatus of claim 11, wherein at least one of the panels is one of semi-transparent and transparent.

* * * * *